April 19, 1927.
H. E. BOHN ET AL
1,625,449
METHOD OF MOLDING PHENOL PLASTIC OR LIKE COMPOUNDS
Filed Aug. 5, 1921
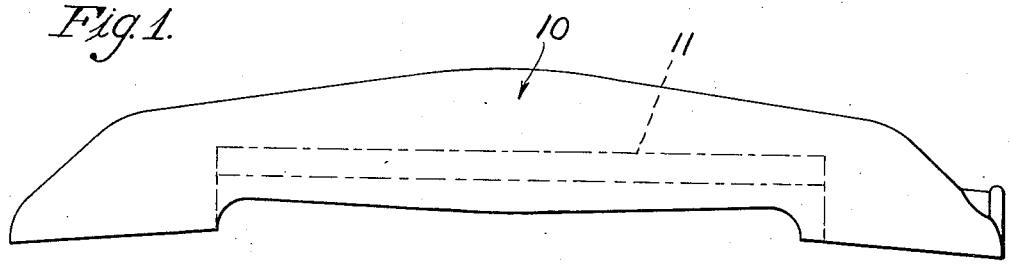
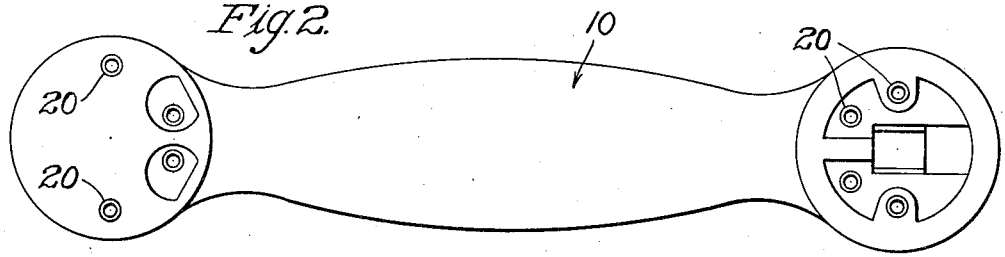
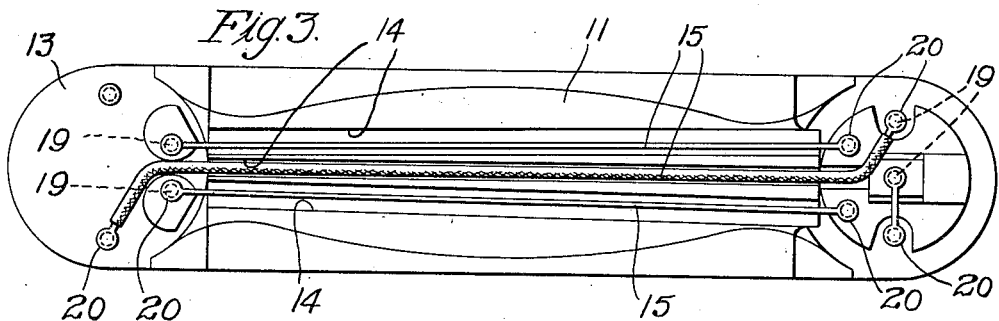
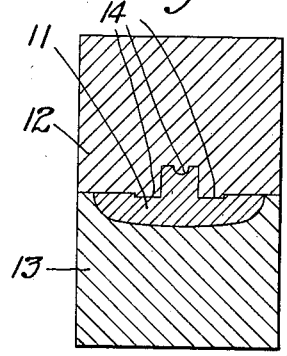
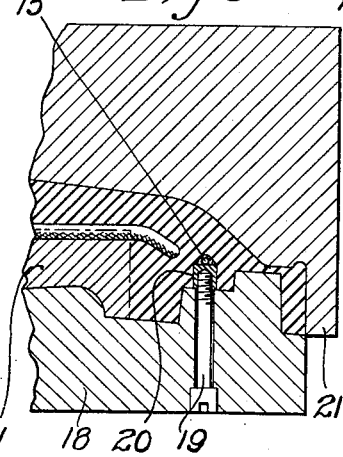
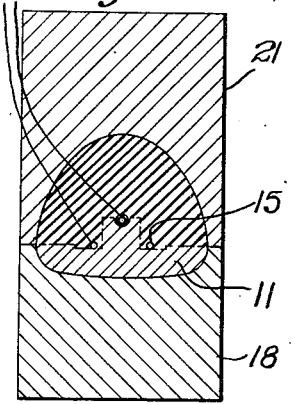
Inventors
Harry E. Bohn
Raymond H. Fauquier
by B. M. Campbell
Atty.

Patented Apr. 19, 1927.

1,625,449

UNITED STATES PATENT OFFICE.

HARRY EARLE BOHN AND RAYMOND HOMER FAUQUIER, OF CHICAGO, ILLINOIS, ASSIGNORS TO WESTERN ELECTRIC COMPANY, INCORPORATED, OF NEW YORK, N. Y., A CORPORATION OF NEW YORK.

METHOD OF MOLDING PHENOL PLASTIC OR LIKE COMPOUNDS.

Application filed August 5, 1921. Serial No. 489,984.

This invention relates to a method of molding phenol or like compounds, and has for its object the molding of phenol plastic or like compounds into articles containing delicate or fragile inserts or connections.

In accordance with the general features of this invention a preliminary support is first molded or shaped and with the fragile inserts or connections carried, secured thereon, or supported thereby is molded with a block of compound into the finished article.

More specifically, the method employed provides for molding or shaping the preliminary support by any suitable means from phenol plastic compound and placing the inserts in position upon the support which may have ridges, recesses, or bosses, etc., formed thereon during the molding thereof for locating or securing the inserts thereto. The preliminary support is then placed in one member of a mold, the inserts positioned thereon either secured or unsecured thereto, depending upon the form and purpose of the inserts in the finished article. A block of phenol plastic compound of a sufficient size is then entered between the molds and heat and pressure applied thereto. While the compound is being propelled by the movable member of the mold the preliminary support prevents the dislocation, breakage or collapse of the inserts. When the heat has softened the compound including the support, the pressure has become equalized and there is no longer any unbalanced force, tending to displace, crush, or break the inserts. The support, being of the same material as the balance of the molding compound, blends with it perfectly during the curing process and is, therefore, not distinguishable in the finished article. The molds are then cooled and separated and the finished article removed.

In the drawings in which this invention is illustrated in connection with a handle for telephone hand sets:

Fig. 1 is a side elevation of the complete article;

Fig. 2 is a bottom view thereof;

Fig. 3 is a plan view of a die with a molded support in place and with inserts used in the finished article in position on the support and secured at their ends to the die;

Fig. 4 is a cross section of a punch and die with the support molded therebetween;

Fig. 5 is a longitudinal section through one end of the punch and die showing the complete article molded, and Fig. 6 is a cross section of the punch and die similar to Fig. 4 but with the complete article molded.

In the practice of the method of this invention the complete molding operation is divided into two stages: First, the forming of a support, the purpose of which is to support whatever fragile inserts or connections are to be a part of the completed article, and second, the molding of the article itself, in which the support first molded is included.

As shown in Fig. 1 of the drawings, 10 represents a complete handle for a telephone hand set with a support 11 forming an integral part thereof shown in dotted outline. The support 11 is molded from phenol plastic or other suitable compound placed between a suitable punch 12 and a die 13, after which heat and pressure is applied. As soon as the compound has softened sufficiently to take the form of the molding cavity the punch and die are cooled as rapidly as practicable. This ends the chemical action beginning to take place in the compound (commonly known as curing) and solidifies the compound. The formed support is then removed from the die and is ready for the second stage. The support 11 is shown molded with recesses 14, 14 formed therein, the purpose of which is to position and support the circuit connectors 15, 15 during the subsequent molding operation.

After the molding of the support 11 it is placed in a die 18 which is used in the subsequent molding operation and the connectors 15, 15 are then positioned in the recesses 14, 14 and secured in place by screws 19, 19 which are inserted through suitable openings in the die 18 and which engage internally screw threaded inserts 20, 20 provided at the ends of the circuit connectors 15, 15. After the final molding operation the screws 19, 19 are removed and the inserts 20, 20 then form the means for connecting together and supporting transmitter and receiver members of a telephone hand set on the handle 10.

In the final molding operation a block of the required amount of phenol plastic or other suitable compound is placed on the support 11 supported in the die 18 with the connectors 15, 15 secured in place as described above, after which a punch 21 and the die 18 are closed. Heat and pressure are then applied and after curing is complete the die is cooled, the punch and die separated and the molded article removed from the die.

The action within the molded cavity during the final molding operation may be described as follows:

When the heat and pressure are applied the formed support 11 is in a solid state and holds the circuit connectors 15, 15, or in another article a different form of insert which may be fragile, in position, preventing their dislocation, collapse or breakage by the molding compound propelled by the punch 21.

By the time the heat has softened the phenol plastic, including the formed support in the die cavity, the pressure has become equalized and there is no longer any unbalanced force tending to displace, crush, or break the inserts, which therefore remain in their proper position. The support being of the same material as the balance of the compound used in molding the complete article blends with it perfectly during the curing process and is therefore not distinguishable in the finished article.

What is claimed is:

1. The method of molding phenolic condensation products into articles with a delicate or fragile insert or connection, which consists in partially treating some of the product to provide a support for the insert or connection, placing the insert or connection on the support, and then molding an additional product with the previously partially treated product to enclose the insert or connection and to complete the molding of the article into a homogeneous mass.

2. The method of molding phenolic condensation products into articles with a delicate or fragile insert or connection, which consists in partially forming the article to provide a partially cured support for the insert or connection, placing the insert or connection on the support, and then molding additional product with the previously formed product to enclose the insert or connection and to complete the molding of the article.

3. The method of molding phenolic condensation products into articles with a delicate or fragile insert or connection, which consists in partially treating some of the product under heat and pressure to provide a support for an insert or connection, placing the insert or connection on the support, and then molding additional product with the previously partially treated product under heat and pressure to enclose the insert or connection and to complete the molding of the article into a homogeneous mass.

4. The method of molding phenolic condensation products into articles with delicate, fragile inserts or connections, which consists in partially forming the article under heat and pressure to provide a partially cured support for the inserts or connections, placing the inserts or connections on the support, and then molding additional product with the previously formed product under heat and pressure to enclose the inserts or connections and to complete the molding of the article.

5. The method of molding phenolic condensation products into articles with delicate or fragile inserts or connections, which consists in molding from the compound a partially cured support for the inserts, placing said support within a mold cavity, placing the inserts in position thereon, placing therewith a block of the compound to complete the article, subjecting the mold to the requisite heat and pressure, and then removing the cured article from the mold with the support forming a part but distinguishable from the article.

6. The method of molding phenolic condensation products into articles, which consists in treating a phenolic condensation product under heat and pressure to partially cure said product, placing additional phenolic condensation product in contact with said first mentioned product, and then treating all of said phenolic condensation product under heat and pressure to produce a unitary, completely cured article.

7. The method of molding phenolic condensation products into articles with a delicate or fragile insert or connection, which consists in partially treating some of the product to provide a support for the insert or connection, positioning the insert or connection upon the support, and then molding an additional product with the previously partially treated product to enclose and make contact with the insert or connection and to complete the molding of the article into a homogeneous mass.

In witness whereof, we hereunto subscribe our names this 22nd day of July A. D., 1921.

HARRY EARLE BOHN.
RAYMOND HOMER FAUQUIER.